United States Patent
Scheidt et al.

(10) Patent No.: US 7,539,855 B1
(45) Date of Patent: May 26, 2009

(54) SERVER-BASED CRYPTOGRAPHY

(75) Inventors: Edward Scheidt, McLean, VA (US); C. Jay Wack, Clarksburg, MD (US)

(73) Assignee: TecSec, Inc., McLean, VA (US)

( * ) Notice: Subject to any disclaimer, the term of this patent is extended or adjusted under 35 U.S.C. 154(b) by 920 days.

(21) Appl. No.: 10/418,312

(22) Filed: Apr. 17, 2003

Related U.S. Application Data (60) Provisional application No. 60/373,132, filed on Apr. 17, 2002.

(51) Int. Cl.
*H04L 9/00* (2006.01)
*H04L 9/32* (2006.01)

(52) U.S. Cl. .................. 713/150; 713/153; 713/189

(58) Field of Classification Search ......... 713/156–159, 713/161, 171–172, 173, 175, 182, 185, 200–201, 713/165, 150, 153, 189, 193–194; 709/223–229; 380/277, 278
See application file for complete search history.

(56) References Cited

U.S. PATENT DOCUMENTS

| | | | | |
|---|---|---|---|---|
| 5,224,038 A | * | 6/1993 | Bespalko | 715/531 |
| 5,347,580 A | * | 9/1994 | Molva et al. | 713/159 |
| 5,375,169 A | | 12/1994 | Seheidt et al. | |
| 5,590,199 A | * | 12/1996 | Krajewski et al. | 713/159 |
| 5,787,173 A | | 7/1998 | Seheidt et al. | |
| 5,870,475 A | * | 2/1999 | Allan et al. | 380/282 |
| 6,490,680 B1 | | 12/2002 | Scheidt et al. | |
| 6,452,608 B1 | | 4/2003 | Scheidt et al. | |
| 6,549,623 B1 | | 4/2003 | Scheidt et al. | |
| 6,606,386 B2 | | 8/2003 | Scheidt et al. | |
| 6,608,901 B2 | | 8/2003 | Scheidt et al. | |
| 6,625,603 B1 | * | 9/2003 | Garg et al. | 707/9 |
| 6,684,330 B1 | | 1/2004 | Wack et al. | |
| 6,714,921 B2 | * | 3/2004 | Stefik et al. | 705/55 |
| 6,976,165 B1 | * | 12/2005 | Carpentier et al. | 713/165 |
| 7,079,653 B2 | | 7/2006 | Scheidt et al. | |
| 7,095,851 B1 | | 8/2006 | Scheidt | |
| 7,095,852 B2 | * | 8/2006 | Wack et al. | 380/44 |
| 7,111,173 B1 | | 9/2006 | Scheidt | |
| 7,212,632 B2 | | 5/2007 | Scheidt et al. | |
| 2002/0031230 A1 | * | 3/2002 | Sweet et al. | 380/278 |
| 2003/0172280 A1 | | 9/2003 | Scheidt et al. | |

* cited by examiner

*Primary Examiner*—Hosuk Song
(74) *Attorney, Agent, or Firm*—IP Strategies (57) ABSTRACT

A system for securing data includes a set of descriptors associated with data, a node, and a server. The set of descriptors include a first group of descriptors, and at least one additional descriptor. Each descriptor has a respective, associated value. The node provides a first component by binding together the respective values of each of the first group of descriptors. The server receives the first component from the node, provides a key by binding together the first component and the respective values of each of the additional descriptor, and encrypts the data with the key. The user (via a token) and/or the server can provide at least one of the descriptors. At least one server can establish a trusted cryptographic virtual domain that exhibits an established trust based on the descriptors that are policy enforced.

21 Claims, 5 Drawing Sheets

SERVER-BASED CRYPTOGRAPHY

CROSS-REFERENCE TO RELATED APPLICATIONS

This disclosure claims the priority benefit of, and incorporates by reference in its entirety, U.S. Provisional Patent Application Ser. No. 60/373,132, filed on Apr. 17, 2002. Additionally, this disclosure is related to, and incorporates by reference in their entireties, U.S. Pat. No. 5,375,169, entitled "Cryptographic Key Management Method and Apparatus," and issued on Dec. 20, 1994 to SCHEIDT et al.; and U.S. Pat. No. 5,787,173, entitled "Cryptographic Key Management Method and Apparatus," and issued on Jul. 28, 1998 to SCHEIDT et al.

FIELD OF THE INVENTION

The present invention relates to data security, key management, and server-based cryptography.

BACKGROUND OF THE INVENTION

In recent years, as distributed processing and open architectures have become more widely employed, it has become apparent that the idea of defining a point-to-point relationship can be overwhelming and nearly impossible. The Internet was designed to afford connectivity; the term "point of presence" was coined because everyone on the Internet is connected to everyone else.

The traditional cryptographic usage has been limited to point to point, box-to-box, and/or user-to-user implementations. In these scenarios, the basic elements of cryptography are the algorithm (the mathematical transposition or substitution of numbers in a defined manner); and the key management scheme, that is, the system by which keys are created, transported, used, tracked, and destroyed.

In the world of digital cryptography, there are not very many key management schemes from which to choose. The first modern scheme was based on private keys (symmetric), in which two or more participants share a single key. Several decades ago, a British mathematician discovered a prime number relationship that allowed the utilization of one number (key) to encrypt and another to decrypt (asymmetric). This key pair relationship is the basis for public/private-key cryptography.

However, key management schemes can suffer from a significant deficiency. The movement of cryptographic keys from sender to receiver can become exceedingly difficult when attempting to achieve a finer, more precise separation of information. Therefore, it would desirable to provide a more efficient key management scheme that still allows for data separation.

Further, in one-to-many information distribution environments, such as a server/client arrangement, implementing cryptographic security over such information can require that each of a myriad of nodes or end-users possesses the cryptographic means to independently access encrypted information. For example, numerous end-users can possess the same cryptographic means to independently access (or decrypt) encrypted data. However, this type of scheme suffers from at least one significant problem. As the number of end-users increases, the likelihood of unauthorized access to a single implementation of such cryptographic means also increases. And where such means includes all, or even most, of the pieces required to access encrypted data, wholesale compromise of the cryptographic scheme becomes easier. Therefore, it would be desirable to provide server-based cryptography so as to minimize such risk.

BRIEF SUMMARY OF THE INVENTION

The present invention includes a cryptographic system and method, in which advantageous key management and/or server-based cryptographic schemes are advanced. Additionally, or alternatively, the present invention effectuates a virtual domain scheme.

According to one exemplary embodiment, the present invention can be embodied in a method of securing data in a system comprising a server communicatively connected to a node. Accordingly, the method can include acts of providing a set of descriptors associated with the data, where the set of descriptors comprises a first plurality of descriptors and a second plurality of descriptors, and each descriptor of the set of descriptors has a respective value associated therewith; providing a first key component by binding together, at the node, the respective values of each of the first plurality of descriptors; sending said first key component from the node to the server; providing a working key by binding together, at the server, the first key component and the respective values of each of the second plurality of descriptors; and encrypting the data with the working key.

According to an optional exemplary aspect of the invention, at least one descriptor of the set of descriptors can be provided by the user via a token having the at least one descriptor stored thereon. Additionally, or alternatively, the node can include the token (where the token in communicatively connected to the node), and providing the first key component can be performed, at least in part, on the token.

According to yet another exemplary aspect of the invention, the at least one descriptor of the set of descriptors can be provided by the server.

According to another exemplary embodiment, the present invention can be embodied in a method of securing data in a system comprising a server communicatively connected to a node. Accordingly, the method can include acts of providing a set of descriptors associated with the data, where the set of descriptors comprises a first plurality of descriptors and at least one additional descriptor, and each descriptor of the set of descriptors has a respective value associated therewith; providing a first key component by binding together, at the node, the respective values of each of the first plurality of descriptors; sending the first key component from the node to the server; providing a working key by binding together, at the server, the first key component and the respective values of each of the at least one additional descriptor; and encrypting the data with the working key.

According to an optional exemplary aspect of the invention, at least one descriptor of the set of descriptors can be provided by the user via a token having the at least one descriptor stored thereon. Additionally, or alternatively, the node can include the token (where the token in communicatively connected to the node), and providing the first key component can be performed, at least in part, on the token.

According to yet another exemplary aspect of the invention, the at least one descriptor of the set of descriptors can be provided by the server.

According to a further exemplary embodiment, the present invention can be embodied in a system for securing data, and includes a set of descriptors associated with the data, a node, and a server communicatively connected to the node. The set of descriptors includes a first plurality of descriptors and a second plurality of descriptors, and each descriptor of the set of descriptors has a respective value associated therewith. The node is adapted to provide a first key component by binding together the respective values of each of the first plurality of descriptors, while the server is adapted to receive the first key component from the node; to provide a working key by binding together the first key component and the respective values of each of the second plurality of descriptors; and to encrypt the data with the working key.

According to an optional exemplary aspect of the invention, at least one descriptor of the set of descriptors can be provided by the user via a token having the at least one descriptor stored thereon. Additionally, or alternatively, the node can include the token (where the token in communicatively connected to the node), and providing the first key component can be performed, at least in part, on the token.

According to yet another exemplary aspect of the invention, the at least one descriptor of the set of descriptors can be provided by the server.

According to still yet another exemplary embodiment, the present invention can be embodied in a system for securing data, and includes a set of descriptors associated with the data, a node, and a first server communicatively connected to the node. The set of descriptors includes a first plurality of descriptors and at least one additional descriptor, and each descriptor of the set of descriptors has a respective value associated therewith. The node is adapted to provide a first key component by binding together the respective values of each of the first plurality of descriptors, while the first server is adapted to receive the first key component from the node, to provide a working key by binding together the first key component and the respective values of each of the at least one additional descriptor, and to encrypt the data with the working key.

According to an optional exemplary aspect of the invention, at least one descriptor of the set of descriptors can be provided by the user via a token having the at least one descriptor stored thereon. Additionally, or alternatively, the node can include the token (where the token in communicatively connected to the node), and providing the first key component can be performed, at least in part, on the token.

According to yet another exemplary aspect of the invention, at least one descriptor of the set of descriptors can be provided by the first server.

According to still yet another exemplary aspect of the invention, the system can further include a policy agent, and a plurality of servers comprising the first server and at least one additional server. The at least one descriptor of the set of descriptors is provided by at least two servers of the plurality of servers, and the policy agent is adapted to control at least one of access to and use of the at least one descriptor according to a security policy.

BRIEF DESCRIPTION OF THE DRAWINGS

The present invention is illustrated by way of example and not in limitation in the figures of the accompanying drawings, in which.

DETAILED DESCRIPTION OF THE INVENTION

The present invention provides a means for controlling the access to and/or use of information by a user. To accomplish this, the present invention provides a key management solution that is partially located on a client side (or node) and partially located on a server side.

The present invention additionally provides the leveraging of cryptography in a virtual domain trust model. Accordingly, the information flow between members of a virtual domain can be enforced through virtual domain cryptography. A virtual domain trust model can be established, for example, by two or more servers sharing parameters and keys. Servers within this trust model can serve one or more roles, such as for example, providing key management (for example, key administration, key or key-data retention), centralizing security control over the virtual domain itself and/or members of the virtual domain, effectuating immediate revocation of a member or the domain itself, in whole or in part, effectuating inter- and intra-domain data scalability, managing databases, and managing security policies associated with identity, accountability, authorization, authentication, and/or access control. Additionally, optionally, a server can provide other servers and/or other domain members with a communication channel for maintaining a key management cycle, in concert with an information process cycle. Also, optionally, a client-based model uses a server to establish a key management state for further processing, whether off-line or on-line. Accordingly, a virtual domain trust domain provides an efficient risk-to-cost ratio in effectuating a communications scheme bridging two or more servers.

Figure 1A:
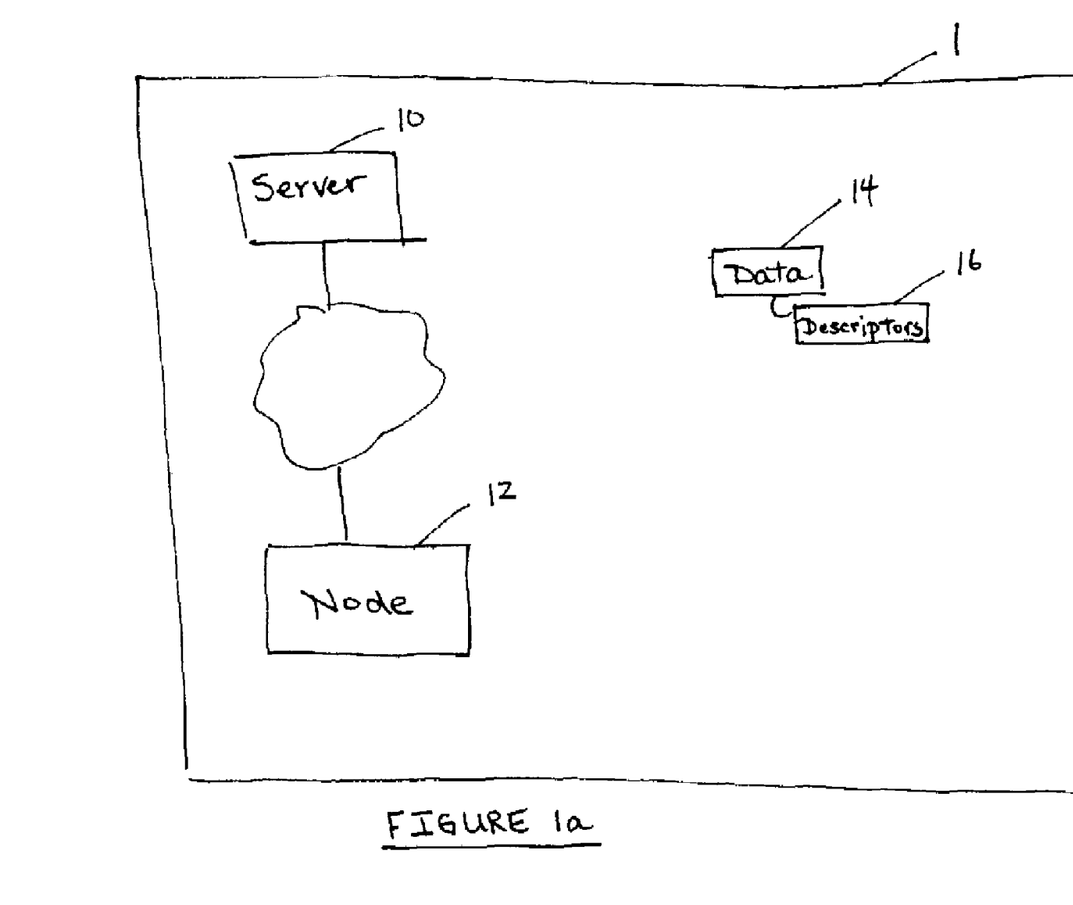
FIG. 1a shows an exemplary embodiment of the present invention, in which a system includes a set of descriptors, and a server communicatively connected to a node.

Reference is now made to FIG. 1a, which shows a system according to an exemplary embodiment of the present invention. As shown in FIG. 1a, a system 1 for securing data 14 can include a server 10; a node 12 communicatively connected to the server; and a set of descriptors 16 associated with data 14. The node and server are communicatively connected via one or more wireless and/or hard-wired connections.

As shown in FIG. 1a, the set of descriptors 16 is associated with data 14. Notably, the particular association technique employed is not necessarily limited to any particular technique(s), and therefore, any manner of association (logical and/or physical) within the scope of the invention can be employed, such as for example, indices, pointers, mapping, physical and/or logical organization, etc.

Figure 1B:
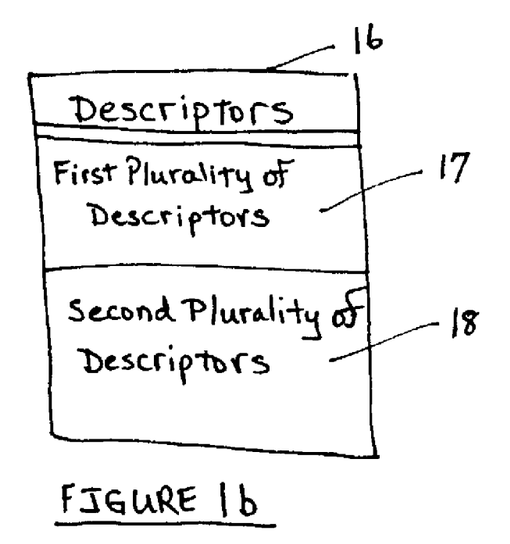
FIG. 1b shows an exemplary instance of descriptors according to the present invention.
Figure 1C:
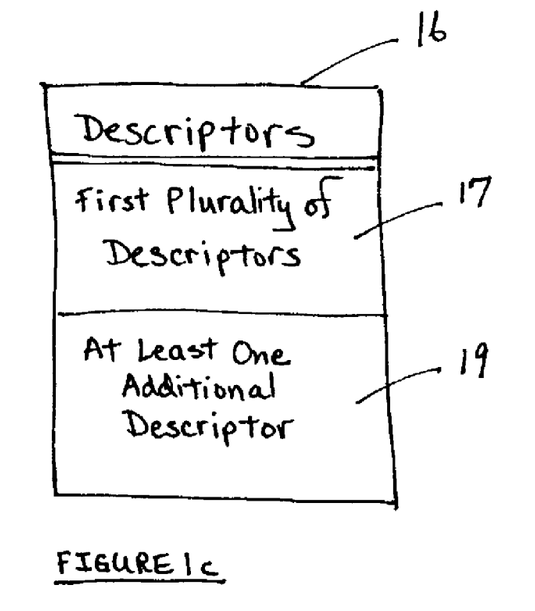
FIG. 1c shows another exemplary instance of descriptors according to the present invention.

As shown in FIG. 1b, in one exemplary embodiment of the present invention the set of descriptors 16 includes a first plurality of descriptors 17 and a second plurality of descriptors 18. As shown in FIG. 1c, in another exemplary embodiment of the present invention, the set of descriptors 16 includes a first plurality of descriptors 17 and at least one additional descriptor 19. In either embodiment, each descriptor has a respective value (not shown) associated therewith. A value is defined as one or more bits of information, and may or may not be unique to the particular descriptor associated therewith.

Node 12 is adapted to provide a first cryptographic key component by binding together the respective values of each of the first plurality of descriptors. Binding is defined as any method of creating a value from two or more data instances, such that the method will create the same value each time given the same two or more data instances. Here, the first key component is created from the first plurality of descriptors. Optionally, node 12 can employ the first key, in whole or in part, in a cryptographic action, such as for example, cryptographically securing information exchanges with server 10.

Further, node 12 is adapted to send the first key to server 10, which can take place either in a direct transfer or an indirect transfer (for example, by physical transportation of a storage device to the server.)

According to an optional exemplary aspect of the invention, at least one of the descriptors can be provided to node 12 by a user via a token having the at least one descriptor stored thereon. A token is a portable memory storage device, such as a floppy disk, a smartcard, a Universal Serial Bus ("USB") fob, a PCMCIA card, for example.

In yet another exemplary aspect of the invention, a token can include a plurality of descriptors and/or a credential set (at least one credential) assigned to a particular user. A credential includes any combination of roles, rules, and permissions assigned to a user. Accordingly, a user's credential set can be used to define at least one of a readership level, an authorship level, and an access level of a particular user. Here, a credential, or portion thereof, can be applied as a descriptor to particular data.

Additionally, a user can optionally be given the opportunity to select one or more descriptors and/or credentials available to him/her, in which case specific constraints on the readership and/or use of the data can be defined by the user, with such constraints being defined, in whole or in part, by the selected descriptors.

For example, data 14 can be a document written by a user, and can have a set of descriptors associated therewith. A descriptor is one or more bits of information that describes data. A descriptor can be associated with data 14 automatically or manually. A descriptor can be based on or limited by one or more credentials. Logic determines which descriptor(s) to associate with data, and can be provided by one or more users, default schemes, and artificial intelligence or data evaluation methodologies, including but not limited to, context-based language evaluation, statistical evaluation or content evaluation. For example, the following are illustrative descriptors of data (a document):

1. a corporate document;
2. associated with program alpha;
3. contains corporate financial data;
4. is budgetary in nature;
5. readership and modifiability requires Executive Access Level;
6. limited to "read only" access by anyone except the author;
7. non-transferable after the initial transfer;
8. non-savable to disk by anyone other than the author;
9. a signature value of the author;
10. unique value of the server;
11. server unique identifier for the document movement;
12. node or token unique identifier;
13. client unique identifier for the document;
14. a value to associate with any spawned version of the original document;
15. time and/or date stamp from the server on the transaction and assignment of values and descriptors;
16. default descriptors;
17. system required descriptors; and
18. any other descriptors required or desired.

Additionally, or alternatively, node 12 can include the token (where the token is communicatively connected to the node), and the respective values of each of the first plurality of descriptors are bound together, at least in part, on the token. This latter aspect can be highly desirable, as execution of the binding function on the token can heighten the security of the cryptographic scheme by executing this binding process in a secured processing environment. Thus, here a token can be a smart card, a Personal Digital Assistant ("PDA"), or any other portable device that is capable of storing and providing information.

Server 10 is adapted to receive the first key component from node 12. Additionally, server 10 provides a working key by binding together the first key component and the respective values of each of the second plurality of descriptors. Alternatively, server 10 provides the working key by binding together the first key component and the at least one additional descriptor 19. In either case, binding is defined the same as above. Next, server 10 encrypts data 14 using the working key, such that data 14 is now secured.

According to still yet another exemplary aspect of the invention, one or more servers exchange at least one domain cryptographic parameter and/or keys (not shown) to allow the creation of a virtual domain, which provides an established trust based on one or more policies corresponding to the parameters and/or keys.

In a further exemplary aspect of the invention, optionally server 10 provides one or more descriptors of the set of descriptors 16.

Once secured, access to and/or use of data 14 will require that anyone seeking such access and/or use must possess and/or have access to the appropriate descriptors required. It should be noted that each and every descriptor initially used in securing data 14 is not necessarily required for subsequent access and/or use of data 14 once secured. Thus, the same, equivalent, and/or higher-ranking descriptors can be required for such access and/or use. Optionally, a descriptor hierarchy can be provided. These descriptor relationships can provide highly advantageous flexibility in effectuating a secured data distribution environment.

Figure 2A:
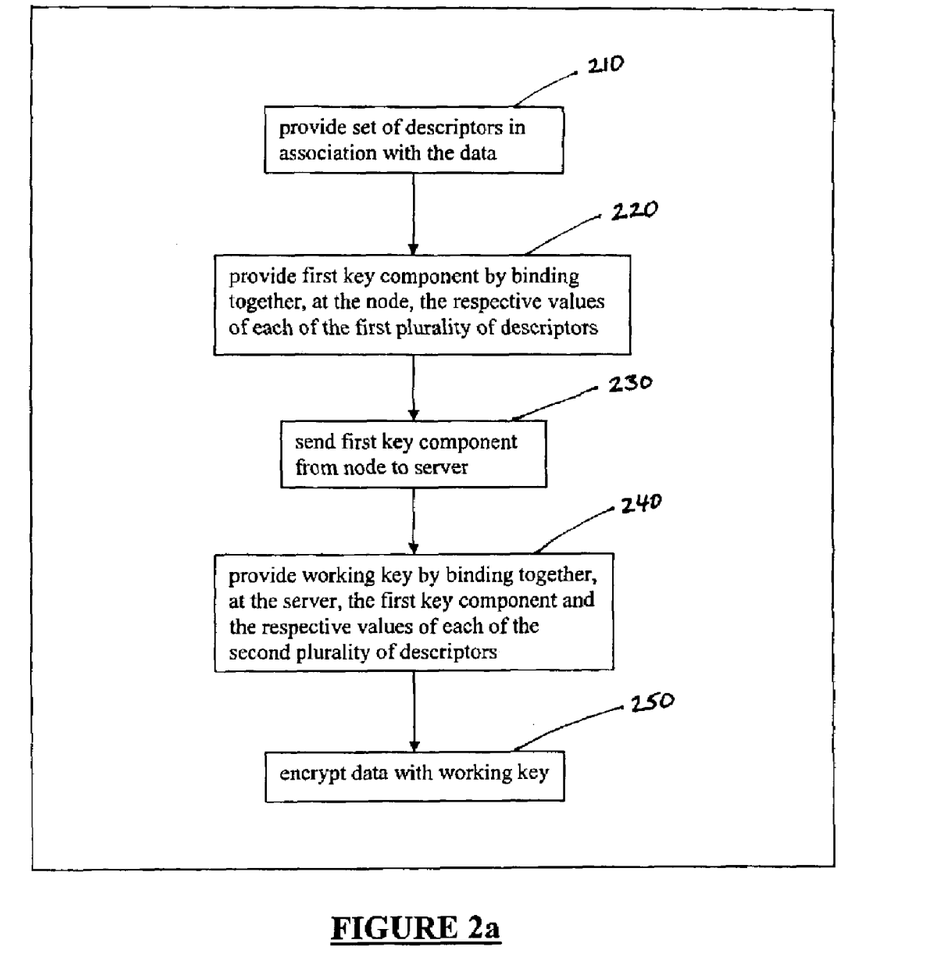
FIG. 2a shows an exemplary method according to the present invention.

FIG. 2a illustrates an exemplary method, according to another exemplary embodiment of the present invention, of securing data in a system comprising a server communicatively connected to a node. Accordingly, such a method can include acts of providing a set of descriptors in association with the data (210); providing a first key component by binding together, at the node, the respective values of each of the first plurality of descriptors (220); sending the first key component from the node to the server (230); providing a working key by binding together, at the server, the first key component and the respective values of each of the second plurality of descriptors (240); and encrypting the data with the working key (250).

Figure 2B:
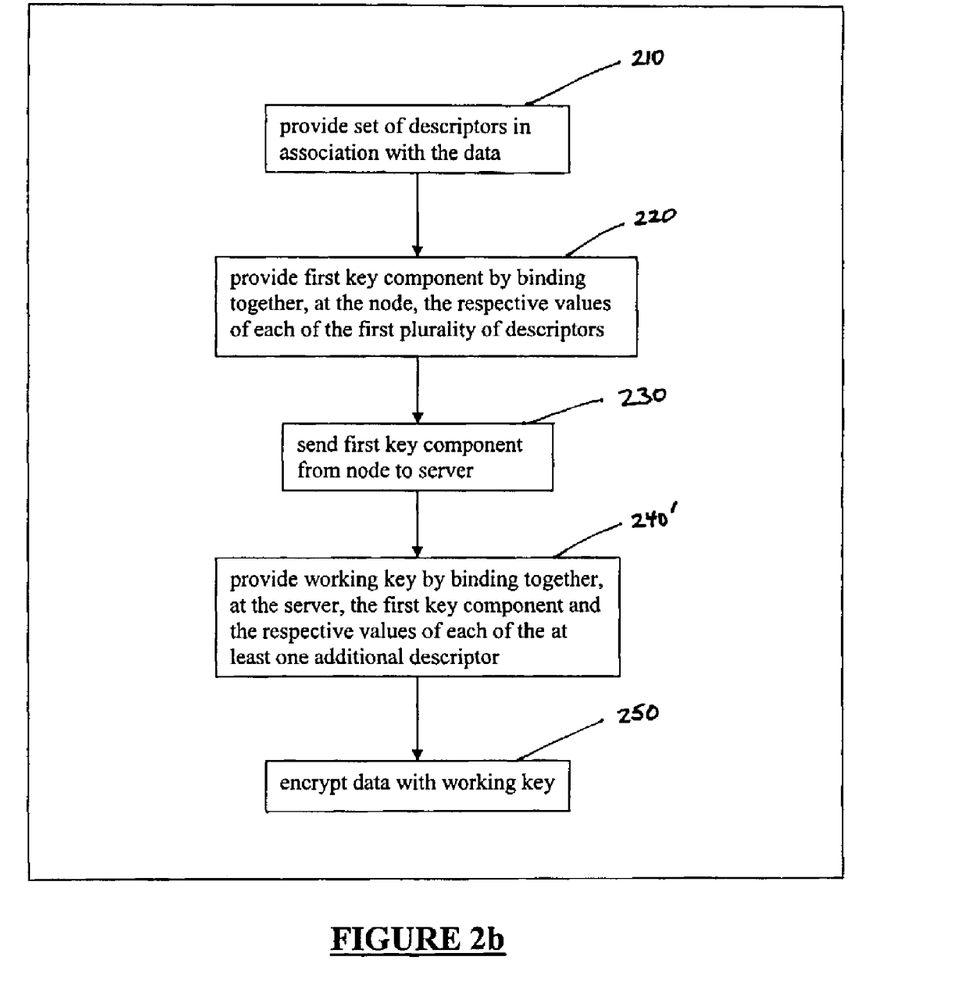
FIG. 2b shows another exemplary method according to the present invention.
Figure 3:
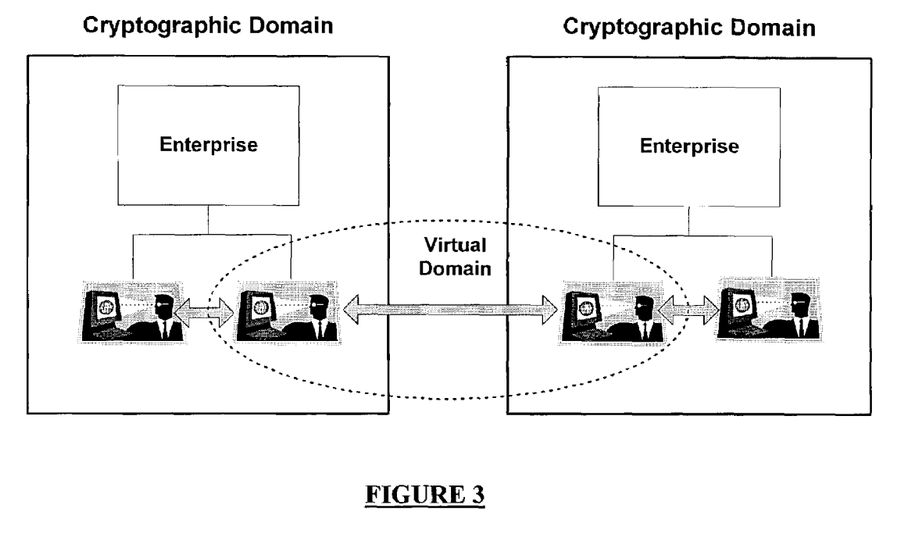
FIG. 3 shows another exemplary aspect according to the present invention, in which secured communications between enterprises is effectuated via a virtual domain.

FIG. 2b illustrates an alternative exemplary method, according to yet another exemplary embodiment of the present invention, of securing data in a system comprising a server communicatively connected to a node. Accordingly, such a method can include acts of providing a set of descriptors in association with the data (210); providing a first key component by binding together, at the node, the respective values of each of the first plurality of descriptors (220); sending the first key component from the node to the server (230); providing a working key by binding together, at the server, the first key component and the respective values of each of the at least one additional descriptor (240'); and encrypting the data with the working key (250).

According to an exemplary optional aspect of the invention, at least one descriptor of the set of descriptors can be provided by a user via a token having the at least one descriptor stored thereon. Further, optionally, the node includes the token, and the act of providing the first key component (220) is performed, at least in part, on the token.

According to another exemplary aspect of the invention, the node includes a token, and the act of providing the first key component (220) is performed, at least in part, on the token.

According to still yet another exemplary aspect of the invention, at least one descriptor of the set of descriptors is provided by the server.

The invention has been described in detail, with reference to one or more exemplary embodiments. It should be understood, however, that the invention is not necessarily limited to the specific processes and arrangements shown and described above, but may be amenable to numerous variations within the scope of the invention.

It will be apparent to one skilled in the art that the manner of making and using the claimed invention has been adequately disclosed in the above-written description of the aspects and embodiments taken together with the drawings.

It will be understood that the above description of the embodiments of the present invention are amenable to various modifications, changes and adaptations, and the same are intended to be comprehended within the meaning and range of equivalents of the appended claims. Accordingly, the specification and drawings are to be regarded in an illustrative and enabling, rather than a restrictive, sense.

We claim:

1. In a system comprising a server communicatively connected to a node, a method of securing data by a user associated with the node, comprising:
   providing a set of descriptors associated with the data, wherein said set of descriptors comprises a first plurality of descriptors and a second plurality of descriptors, and each descriptor of the set of descriptors has a respective value associated therewith;
   providing a first key component by binding together, at the node, the respective values of each of the first plurality of descriptors;
   sending said first key component from the node to the server;
   providing a working key by binding together, at the server, said first key component and the respective values of each of the second plurality of descriptors; and
   encrypting the data with said working key.

2. The method of claim 1, wherein
   at least one descriptor of said set of descriptors is provided by the user via a token having the at least one descriptor stored thereon.

3. The method of claim 2, wherein
   the node includes the token, and
   providing said first key component is performed, at least in part, on the token.

4. The method of claim 1, wherein
   the node includes a token, and
   providing said first key component is performed, at least in part, on the token.

5. The method of claim 1, wherein
   at least one descriptor of said set of descriptors is provided by the server.

6. In a system comprising a server communicatively connected to a node, a method of securing data by a user associated with the node, comprising:
   providing a set of descriptors associated with the data, wherein said set of descriptors comprises a first plurality of descriptors and at least one additional descriptor, and each descriptor of said set of descriptors has a respective value associated therewith;
   providing a first key component by binding together, at the node, the respective values of each of the first plurality of descriptors;
   sending said first key component from the node to the server;
   providing a working key by binding together, at the server, said first key component and the respective values of each of the at least one additional descriptor; and
   encrypting the data with said working key.

7. The method of claim 6, wherein
   at least one descriptor of said set of descriptors is provided by the user via a token having the at least one descriptor stored thereon.

8. The method of claim 7, wherein
   the node includes the token, and
   providing said first key component is performed, at least in part, on the token.

9. The method of claim 6, wherein
   the node includes a token, and
   providing said first key component is performed, at least in part, on the token.

10. The method of claim 6, wherein
    at least one descriptor of said set of descriptors is provided by the server.

11. A system for securing data, said system comprising:
    a set of descriptors associated with the data, wherein said set of descriptors comprises a first plurality of descriptors and a second plurality of descriptors, and each descriptor of said set of descriptors has a respective value associated therewith;
    a node adapted to provide a first key component by binding together the respective values of each of the first plurality of descriptors; and
    a server communicatively connected to said node;
    wherein said server is adapted to receive the first key component from said node, to provide a working key by binding together the first key component and the respective values of each of the second plurality of descriptors, and to encrypt the data with the working key.

12. The system of claim 11, wherein
    at least one descriptor of said set of descriptors is provided by a user via a token having the at least one descriptor stored thereon.

13. The system of claim 12, wherein
    said node includes the token, and
    the respective values of each of the first plurality of descriptors are bound together, at least in part, on the token.

14. The system of claim 11, wherein
    said node includes a token, and
    the respective values of each of the first plurality of descriptors are bound together, at least in part, on the token.

15. The system of claim 11, wherein
    at least one descriptor of said set of descriptors is provided by said server.

16. A system for securing data, said system comprising:
    a set of descriptors associated with the data, wherein said set of descriptors comprises a first plurality of descriptors and at least one additional descriptor, and each descriptor of said set of descriptors has a respective value associated therewith;
    a node adapted to provide a first key component by binding together the respective values of each of the first plurality of descriptors; and
    a first server communicatively connected to said node;
    wherein said first server is adapted to receive the first key component from the node, to provide a working key by binding together the first key component and the respective values of each of the at least one additional descriptor, and to encrypt the data with the working key.

17. The system of claim 16, wherein
at least one descriptor of said set of descriptors is provided by a user via a token having the at least one descriptor stored thereon.

18. The system of claim 17, wherein
said node includes the token, and
the respective values of each of the first plurality of descriptors are bound together, at least in part, on the token.

19. The system of claim 16, wherein
said node includes a token, and
the respective values of each of the first plurality of descriptors are bound together, at least in part, on the token.

20. The system of claim 16, wherein
at least one descriptor of the set of descriptors is provided by said first server.

21. The system of claim 16, further comprising:
a plurality of servers comprising said first server and at least one additional server; and
a policy agent;
   wherein at least one descriptor of said set of descriptors is provided by at least two servers of said plurality of servers, and said policy agent is adapted to control at least one of access to and use of the at least one descriptor according to a policy.

* * * * *